United States Patent
Yasutomi

(10) Patent No.: US 9,245,319 B2
(45) Date of Patent: Jan. 26, 2016

(54) IMAGE PROCESSING DEVICE, IMAGE PROCESSING METHOD, AND IMAGE FORMING APPARATUS THAT PERFORM AN ENHANCEMENT PROCESS TO INPUT IMAGE DATA

(71) Applicant: Kei Yasutomi, Tokyo (JP)

(72) Inventor: Kei Yasutomi, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 218 days.

(21) Appl. No.: 13/958,847

(22) Filed: Aug. 5, 2013

(65) Prior Publication Data
US 2014/0044373 A1 Feb. 13, 2014

(30) Foreign Application Priority Data

Aug. 10, 2012 (JP) ................................. 2012-178807

(51) Int. Cl.
*G06K 9/40* (2006.01)
*G06T 5/00* (2006.01)
(52) U.S. Cl.
CPC . *G06T 5/00* (2013.01); *G06T 5/003* (2013.01); *G06T 2207/10024* (2013.01); *G06T 2207/20012* (2013.01); *G06T 2207/20192* (2013.01)
(58) Field of Classification Search
None
See application file for complete search history.

(56) References Cited

U.S. PATENT DOCUMENTS

| 7,545,984 B1* | 6/2009 | Kiel et al. ..................... 382/220 |
| 2004/0054542 A1* | 3/2004 | Foote et al. ................... 704/500 |
| 2005/0088697 A1 | 4/2005 | Yasutomi et al. |
| 2005/0163378 A1* | 7/2005 | Chen ............................ 382/190 |
| 2005/0237575 A1* | 10/2005 | Yamazaki ..................... 358/3.03 |
| 2006/0279589 A1 | 12/2006 | Yasutomi et al. |
| 2007/0263929 A1 | 11/2007 | Kaji |
| 2009/0279757 A1* | 11/2009 | Drabycz et al. ............... 382/128 |
| 2010/0067826 A1* | 3/2010 | Honsinger et al. ............ 382/280 |
| 2010/0284584 A1* | 11/2010 | Maeda et al. ................. 382/128 |
| 2011/0222125 A1 | 9/2011 | Yasutomi et al. |
| 2012/0236334 A1* | 9/2012 | Suzuki .......................... 358/1.9 |

FOREIGN PATENT DOCUMENTS

| JP | 2004-171231 | 6/2004 |
| JP | 4348315 | 7/2009 |
| JP | 2010-026937 | 2/2010 |
| JP | 4821611 | 9/2011 |

* cited by examiner

*Primary Examiner* — Wenpeng Chen
(74) *Attorney, Agent, or Firm* — Oblon, McClelland, Maier & Neustadt, L.L.P.

(57) ABSTRACT

An image processing device, method, computer readable storage medium, and image forming device that calculate spatial frequency of input image data and determine a frequency component in which a distribution amount of the spatial frequency maximizes, and perform an enhancement process by applying, to the input image data, an enhancement amount that varies according to the distribution amount of the spatial frequency, based on the determined frequency component.

11 Claims, 7 Drawing Sheets

IMAGE PROCESSING DEVICE, IMAGE PROCESSING METHOD, AND IMAGE FORMING APPARATUS THAT PERFORM AN ENHANCEMENT PROCESS TO INPUT IMAGE DATA

CROSS REFERENCE TO RELATED APPLICATION

The present application claims a benefit of priority to and incorporates by reference the entire contents of Japanese Patent Application No. 2012-178807 filed in Japan on Aug. 10, 2012.

BACKGROUND OF THE INVENTION

1. Field of the Invention

The present invention relates to an image processing device, an image processing method, and an image forming apparatus including the image processing device.

2. Description of the Related Art

Electrophotographic or inkjet image forming apparatuses are known in forms of copying machines, optical printers, optical plotters, facsimile machines, multifunction peripherals, and the like.

Such an image forming apparatus performs image formation based on input image data, which is data representing an image to be formed.

Examples of the input image data include scan data obtained by reading an original document with a scanner, data generated by a computer or the like, and data supplied via a communication line.

Other examples of the input image data include image data obtained by photographing using a digital camera or an image capturing apparatus of various types and image data generated by image editing software.

These image forming apparatuses generally apply "image processing of various types" to the input image data so that output image data for use in forming a desired image can be obtained.

The output image data may be output as an image formed onto a recording medium, such as recording paper, or displayed as an output image on a display device of various types.

There are known various image processing methods, some of which employ spatial frequency enhancement (as disclosed in, for instance, Japanese Laid-open Patent Application No. 2004-171231 and Japanese Patent No. 4821611).

A visible output image formed from output image data is generally a two-dimensional image. It is preferable that visually-perceived depth and material's texture intrinsic to a subject of the image are reproduced favorably.

A technique disclosed in Japanese Laid-open Patent Application No. 2004-171231 relates to reproduction of an image of "a condition of crevices, dikes, and the like on a cut surface of rock or rock outcropping" and achieves favorable reproduction of depth perception in the image.

A technique disclosed in Japanese Patent No. 4821611 is directed at reproduction of an image that is a "visceral radiograph" and successfully achieves enhancement of a desired observational portion of the image.

However, the techniques disclosed in Japanese Laid-open Patent Application No. 2004-171231 and Japanese Patent No. 4821611 are limited in "photograph subjects to be displayed as output images".

Possible subjects of input images have a wide range of variations. Image processing that increases reproducibility of perceived depth and material's texture in output images of subjects of a wide range of variations is not known yet.

There is a need for an image processing device capable of generating, from input image data of a subject of a wide variety of types, output image data that is increased in visually-perceived surface roughness and texture intrinsic to the subject.

There is a need for an image processing method that allows generating, from input image data which is image data of a subject of a wide range of types, output image data that is increased in visually-perceived surface roughness and texture intrinsic to the subject.

There is also a need for an image forming apparatus including the image processing device.

The present invention at least partially solves the problems in the conventional techniques.

SUMMARY OF THE INVENTION

According to an aspect of the invention, an image processing device that is implemented on a computer is provided. The image processing device includes: enhancement direction determining unit configured to calculate spatial frequency of input image data and determine frequency component in which distribution amount of the spatial frequency maximizes; and enhancement processing unit configured to perform enhancement process by applying, to the input image data, enhancement amount that varies according to the distribution amount of the space frequency, based on the determined frequency component.

According to another aspect of the invention, an image processing method implemented by a computer is provided. The method includes: calculating spatial frequency of input image data; determining frequency component in which distribution amount of the spatial frequency maximizes; and applying, to the input image data, enhancement amount that varies according to the distribution amount of the space frequency, based on the determined frequency component.

According to another aspect of the invention, a computer program product comprising a non-transitory computer readable storage medium in which computer program instructions are stored, which instructions, when executed by a computer, cause the computer to perform image processing method is provided. The method includes: calculating spatial frequency of input image data; determining frequency component in which distribution amount of the spatial frequency maximizes; and applying, to the input image data, enhancement amount that varies according to the distribution amount of the space frequency, based on the determined frequency component.

BRIEF DESCRIPTION OF THE DRAWINGS

The above and other objects, features advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Referring to the accompanying drawings, various embodiments and alternatives are described below. However, it should be noted that the invention is not limited to such embodiments and alternatives.

Preferred embodiments are described below with reference to the accompanying drawings.

A first embodiment is described below with reference to FIGS. 1 and 2.

Figure 1:
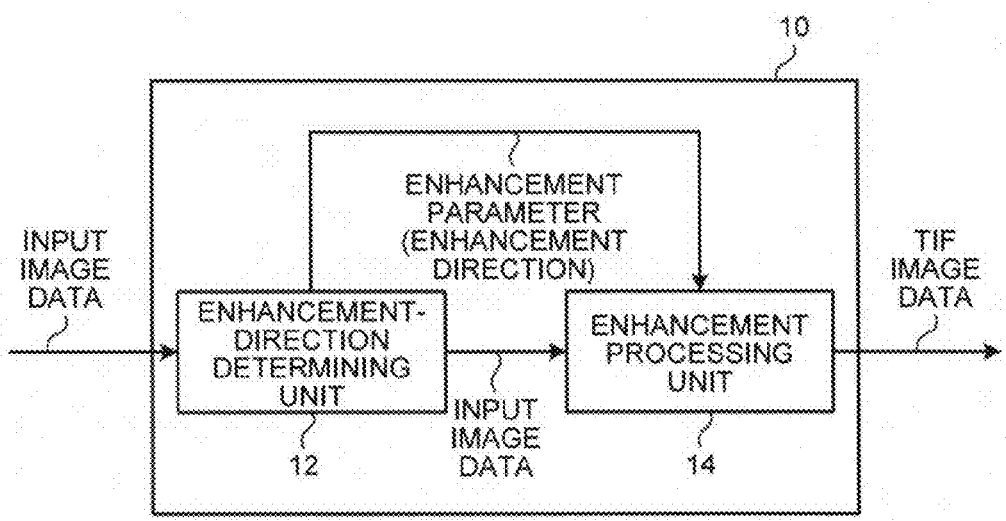
FIG. 1 is a diagram for describing an image processing device according to a first embodiment.

FIG. 1 is an explanatory diagram of an image processing device according to the first embodiment.

In the first embodiment, an image processing device 10 includes an enhancement-direction determining unit 12 and an enhancement processing unit 14.

These can be embodied as a computer. The enhancement-direction determining unit 12 and the enhancement processing unit 14 can be configured as computer program instructions.

In the first embodiment, "image data of a versatile format (in this example, TIF format)" is input as input image data, and image processing is performed on this input image data.

The image-processed data generated as output image data is output as a file of "image data of a versatile format (in this example, the TIF format)".

In this example, each of the input image data and the output image data is of the "TIF format" and has three-color components, RGB. Each pixel has 16-bit data per color.

When input image data is input to the image processing device 10, first, the enhancement-direction determining unit 12 determines an "enhancement direction".

"The enhancement direction" denotes spatial frequency components to be enhanced, and hereinafter also referred to as "the enhancement parameter".

Subsequently, the enhancement processing unit 14 applies "enhancement" to the input image data. This enhancement is performed based on the enhancement parameter determined by the enhancement-direction determining unit 12.

These will be described more specifically below.

The enhancement-direction determining unit 12 multiplies each of RGB color components of the input image data by a "Hanning window", which is a windowing function, and performs "discrete Fourier transform" on a result of the windowing.

Hereinafter, discrete Fourier transform is abbreviated to "DFT".

Meanwhile, same processing is applied to the respective color components R, G, and B of the input and output image data, and therefore processing applied to one component is described below.

When the input image data is put as "f(x,y)" and the Hanning window as "H(x,y)", image data g(x,y), which is the result of multiplication by the Hanning window, can be calculated using Equation (1) below.

$g(x,y) = f(x,y) \times H(x,y)$ $H(x,y) = (0.5 - 0.5 \cos(2\pi x/(M-1))) \times (0.5 - 0.5 \cos(2\pi y/(N-1)))$ (1)

In Equation (1), M and N denote "the number of pixels in the x direction" and "the number of pixels in the y direction", respectively, of the input image data f(x,y) (x=0 . . . M−1, y=0 . . . N−1).

DFT is then performed on "g(x,y)", which is a result of the calculation, to obtain a two-dimensional spatial frequency spectrum G(u,v) using Equation (2) below.

$$G(u, v) = \sum_{x=0}^{M-1} \sum_{y=0}^{N-1} g(x, y) e^{-i 2\pi \left(\frac{ux}{M} + \frac{vy}{N}\right)} \quad (2)$$

$u = 0, \ldots, M-1; v = 0, \ldots N-1$

Subsequently, "a spatial frequency k in one-dimensional expression" is calculated using Equation (3) below.

$$k = \sqrt{k_x^2 + k_y^2} \quad (3)$$

where $k_x = u/M \times R/25.4 \quad$ for $u \leq M/2$
$\quad = (M-u)/M \times R/25.4 \quad$ for $u > M/2$ $k_y = v/N \times R/25.4 \quad$ for $v \leq N/2$
$\quad = (N-v)/N \times R/25.4 \quad$ for $v > N/2$ In Equation (3), "R" denotes a resolution expressed in dots per inch (dpi). The denominator "25.4" is put because 1 inch is equal to 25.4 millimeters (mm).

The resolution R may be embedded in image data; in that case, this "embedded value" can be used.

The resolution R depends on a displayed size on a display or the like (or a printed size), and is not uniquely determined only by the image data.

In this example, the resolution R is set to 300 dpi because 300 to 400 dpi or higher is required of image data usable as a high-quality printed document.

Note that the value of the resolution R is not limited thereto, and can be designated and determined on an assumption that the image data is to be displayed on a display or output as a hardcopy.

Coordinate conversion is applied to the two-dimensional spatial frequency spectrum G(u,v) from coordinates "u,v" in the rectangular coordinate system to coordinates "k,θ" in the polar coordinate system (see Formula (4) below).

$G(u,v) \rightarrow G(k,\theta)$ $k = \sqrt{k_x^2 + k_y^2}$ $\theta = \theta_{x,y}$ (4)

where θx,y is a real number that satisfies the following equation:

$$\begin{pmatrix} k_x \\ k_y \end{pmatrix} = \sqrt{k_x^2 + k_y^2} \begin{pmatrix} \sin\theta_{x,y} \\ \cos\theta_{x,y} \end{pmatrix}$$

$0 \leq \theta_{x,y} < 2\pi$

Calculation of distribution $G_l(\theta)$ in a angular direction is performed on the result of the coordinate conversion.

In this calculation, a range of the spatial frequency k is limited to "0.0<k<1.0, which is a range to which spatial frequency component enhancement is to be applied in the next step".

Although the spatial frequency spectrum is a complex number, what matters is only magnitude. Accordingly, the angular distribution $G_l(\theta)$ is calculated using Equation (5) below.

$$G_l(\theta) = \sum_k |G(k, \theta)| \tag{5}$$

The sum ($\Sigma$) of Equation (5) is calculated only for the spatial frequency k in the range of "0.0<k<1.0".

Because the DFT calculation is used, values of the angle $\theta$ are discrete values at irregular intervals.

Accordingly, in actual calculation, the sum is calculated by "segmenting the range $0 \leq \theta < 2\pi$ into 360 segments" and adding, for each of the segments, every spatial frequency spectrum of which $\theta$ belongs to one of the segments.

This calculation is expressed by Equation (6).

$$G_l(\theta_m) = \sum_{\theta_m \leq \theta < \theta_{m+1}} \sum_k |G(k, \theta)| \tag{6}$$

$$\theta_m = 2\pi/360 \times m$$

$$m = 0, \ldots, 359$$

The "number of segments 360" in Equation (6) can be another value.

$G_l(\theta_m)$ obtained in this manner is the "angular distribution of the spatial frequency spectrum" in the frequency range of interest (0.0<k<1.0).

The enhancement parameter necessary for "anisotropic spatial frequency component enhancement" to be performed in the next step is calculated from the obtained $G_l(\theta_m)$.

The enhancement parameter is the "enhancement direction" or, more specifically, "the direction where greater enhancement is to be applied".

Note that the "direction" is not "direction in actual space" but a direction in the two-dimensional space of spatial frequencies.

Calculation of the enhancement parameter is performed by "sequentially calculating "$S_{\theta_n}$" for each n" using Equation (7) below and comparing magnitudes of the calculated $S_{\theta_n}$.

$$S_{\theta_n} = \sum_m G_l(\theta_m) \times \cos(2(\theta_m - \theta_n)) \tag{7}$$

$$\theta_m = 2\pi/360 \times m$$

$$\theta_n = 2\pi/360 \times n$$

$$n, m = 0, \ldots, 179$$

Because the cycle period of $Gl(\theta m)$ is $\pi$, the sum can be calculated from n and m in the above range.

Values of "$S_{\theta_n}$" calculated in this manner are compared against each other, thereby determining "$\theta_n$ that maximizes $S_{\theta_n}$" as the enhancement parameter φd (enhancement direction to which greater enhancement is to be applied).

In this determination, the enhancement parameter φd is determined by utilizing relation that "the value of $S_{\theta_n}$ increases in a direction where the value of $G_l(\theta_m)$ is large".

In other words, in the spatial frequency enhancement to be performed in the next step, "greater enhancement is applied to the direction where the value of $G_l(\theta_m)$ is large".

Note that a method for determining the enhancement parameter φd is not limited to the method described above.

For instance, there can be employed a more simple method that sets "the direction where the value of $G_l(\theta_m)$ is globally or locally maximized" as the enhancement parameter φd.

However, $G_l(\theta_m)$ generally "oscillates in a wavelike manner at a short cycle period with a large amplitude" in many cases. Accordingly, the simple method using the global or local maximum value can fail to extract broader, overall tendency of $G_l(\theta)$.

In the first embodiment described above, the enhancement parameter φd is determined using the method described above to take this also into consideration.

In the method described above, the Hanning window is used as the "windowing function" by which the input image data f(x,y) is to be multiplied. However, the windowing function is not limited to the Hanning window but can be another type of windowing function.

The enhancement-direction determining unit 12 performs "determination of the enhancement direction" as described above, thereby obtaining the enhancement parameter φd.

The enhancement processing unit 14 performs enhancement described below using the enhancement parameter φd determined as described above.

The enhancement processing unit 14 performs discrete Fourier transform (DFT) on each of the RGB color components of the input image data first, thereby calculating a "two-dimensional spatial frequency spectrum".

A calculation method therefor is similar to the method employed by the enhancement-direction determining unit 12 to calculate the two-dimensional spatial frequency spectrum G(u,v), but different therefrom in not including "multiplication by a windowing function".

Same processing is applied to the respective RGB color components of the input image data also in the enhancement processing unit 14. Accordingly, a processing method for one color component is described below.

A to-be-obtained spatial frequency spectrum F(u,v) is obtained by calculating Equation (8) using the image data f(x,y).

$$F(u, v) = \sum_{x=0}^{M-1} \sum_{y=0}^{N-1} f(x, y) e^{-i2\pi\left(\frac{ux}{M} + \frac{vy}{N}\right)} \tag{8}$$

$$u = 0, \ldots, M - 1; v = 0, \ldots N - 1$$

In Equation (8), M and N denote "the number of pixels in the x direction" and "the number of pixels in the y direction", respectively, of the image data.

Subsequently, "the spatial frequency k in one-dimensional expression" is calculated using Equation (9) below.

As in the description given earlier, the resolution R is expressed in dpi. In Equation (9), "25.4" is put because 1 inch is equal to 25.4 millimeters.

$$k = \sqrt{k_x^2 + k_y^2} \quad (9)$$

where $$k_x = u/M \times R/25.4 \quad \text{for } u \leq M/2$$
$$= (M-u)/M \times R/25.4 \quad \text{for } u > M/2$$
$$k_y = v/N \times R/25.4 \quad \text{for } v \leq N/2$$
$$= (N-v)/N \times R/25.4 \quad \text{for } v > N/2$$

The spatial frequency calculated using Equation (9) is expressed in cycles/mm.

In the first embodiment, spatial frequency spectrum enhancement is applied to a spatial frequency region corresponding to a range where the calculated spatial frequency k is between 0.0 and 1.0 (cycles/mm).

More specifically, enhanced spatial frequency components F'(u,v) are calculated by performing enhancement according to Equation (10) below.

$$F'(u,v) = \left(1.0 + \left(\frac{0.3 + 0.2 \times}{\cos(2(\phi - \phi d))}\right)\right) \times F(u,v) \quad \text{for } 0.0 < k < 1.0 \quad (10)$$
$$= F(u,v) \quad \text{for } k = 0.0 \text{ or } k \geq 1.0$$

In Equation (10), "φd" is the enhancement parameter φd determined earlier.

In Equation (10), "p" denotes a "polar angle" of the spatial frequency k in the one-dimensional expression in the polar coordinates, and is the angle $\theta_{x,y}$ that satisfies Equation (11) below.

$$\begin{pmatrix} k_x \\ k_y \end{pmatrix} = \sqrt{k_x^2 + k_y^2} \begin{pmatrix} \sin\theta_{x,y} \\ \cos\theta_{x,y} \end{pmatrix} \quad (11)$$
$$0 \leq \theta_{x,y} < 2\pi$$

Equation (10) indicates that "one of two enhancement operations is applied" depending on the range within which the spatial frequency k falls.

More specifically, enhancement is performed so as to increase values of the spatial frequency spectrum in the spatial frequency region where the spatial frequency k is in the range between 0.0 and 1.0 (cycles/mm).

That is, enhancement is performed by multiplying the spatial frequency spectrum by "(1.0+(0.3+0.2×cos(2(φ−φd))))".

The value "(1.0+(0.3+0.2×cos(2(φ−φd))))" to be multiplied maximizes in a direction where φ is equal to φd, and decreases as φ departs from φd.

That is, the enhancement applied to the range where the spatial frequency k is between 0.0 and 1.0 (cycles/mm) is enhancement in which an enhancement amount increases toward the enhancement parameter φd.

Enhancement is not applied to other spatial frequency regions (k=0, k≥1.0) than the above range, and the "spatial frequency spectrum F(u,v)" of the regions remains unchanged.

Hereinafter, the value by which the spatial frequency spectrum is to be multiplied is denoted as enhancement coefficient $\alpha_k$.

More specifically, the enhancement coefficient $\alpha_k$ is given by Equation (12) below.

$$\alpha_k = 1.0 + (0.3 + 0.2 \times \cos(2(\phi - \phi d))) \quad \text{for } 0.0 < k < 1.0 \quad (12)$$
$$= 1.0 \quad \text{for } k = 0.0 \text{ or } k \geq 1.0$$

Figure 2:
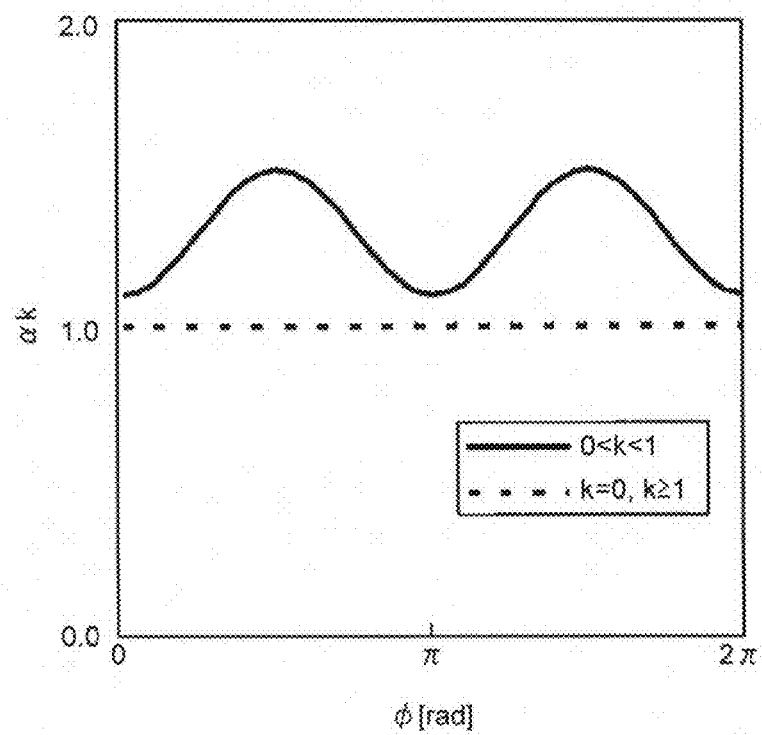
FIG. 2 is a diagram illustrating an example of an anisotropic enhancement coefficient.

FIG. 2 illustrates the enhancement coefficient $\alpha_k$.

The enhancement coefficient $\alpha_k$ is determined by the enhancement-direction determining unit 12 according to the input image data. In FIG. 2, the enhancement parameter φd is set to π/2 for simplicity of explanation.

The "curve indicated by a solid line" in FIG. 2 is the enhancement coefficient for the spatial frequency k in the range of "0.0<k<1.0".

Referring to the curve, the enhancement coefficient $\alpha_k$ increases and decreases periodically between a maximum value 1.5 (φ=π/2, 3π/2) and a minimum value 1.1 (φ=0, π).

Thus, an enhancement amount varies in the angular direction (in the φ direction) of the spatial frequency spectrum (anisotropically).

The enhancement method using Equation (12) maximizes the enhancement amount in the "direction where the angle φ coincides with the enhancement parameter φd".

As the angular difference between the enhancement parameter φd and the angle φ increases, the enhancement amount gradually decreases.

Referring to the "broken line" in FIG. 2 that indicates the enhancement coefficient for the spatial frequency k that satisfies "k=0.0 or k≥1.0", the enhancement coefficient does not change with the angle φ as described above.

The spatial frequency components F(u,v) have a "property of having a cycle period π in the angular direction (in the φ direction)" for any input image data.

For this reason, the enhancement coefficient $\alpha_k$ is set to have the same cycle period π.

The enhancement processing unit 14 performs "inverse discrete Fourier transform (inverse DFT)" on F'(u,v), which is generated by applying the enhancement to F(u,v) as described above, to obtain enhanced image data.

This "enhanced image data" is denoted as f'(x,y).

The inverse DFT is performed using Equation (13) below.

$$f'(x,y) = \frac{1}{MN} \sum_{u=0}^{M-1} \sum_{v=0}^{N-1} F'(u,v) e^{j2\pi\left(\frac{ux}{M} + \frac{vy}{N}\right)} \quad (13)$$
$$x = 0, \ldots, M-1; y = 0, \ldots N-1$$

The enhancement processing unit 14 includes a "file output unit".

The file output unit generates TIF data, which is data of a versatile format, based on the "enhanced image data" obtained as described above, and outputs a file of the TIF data to an external storage device (not shown).

This output "TIF data" is the output image data.

In the example described above, it is assumed that each of the input image data and the output image data is of the "TIF format" and has three-color components, RGB; and each pixel has 16-bit data per color.

However, a file format of the input image data or the output image data is not limited to the TIF format, but can be another file format such as JPEG or PNG.

Moreover, a color space of the color components is not limited to the RGB color space, but can be a color space other than the RGB. The amount of data per pixel may be a data amount other than 16 bits.

More specifically, although the image data to which the enhancement is applied is RGB color-space image data in the above description, the image data may be CMYK image data, XYZ image data, Lab image data, or the like.

Moreover, for example, the resolution R, which is the resolution per pixel, is not limited to the value (which is 16 bits in the above description).

In the first embodiment described above, the enhancement is performed using DFT in the frequency space; however, this is not requisite for the present invention.

Alternatively, a scheme of, for instance, creating a "filter that enhances a specific frequency region" and performing filtering by "convolution with input image data" can be employed.

This scheme also allows achieving enhancement similar to that described above.

Findings of the inventor about texture and surface roughness (perceived depth) of a subject are reflected in the first embodiment.

More specifically, the enhancement-direction determining unit 12 calculates "angular distribution of spatial frequency components of an input image" for determination of the enhancement parameter $\phi d$.

The enhancement-direction determining unit 12 determines a direction where relatively large spatial frequency components lie as the "enhancement parameter".

The first embodiment described above is configured such that the enhancement processing unit 14 enhances frequency components specified according to the enhancement parameter.

The present inventor has found that, in a large number of images, "direction where spatial frequency components of an image increase in magnitude coincides with direction where shade is given in the image".

According to the first embodiment, "an output image is generated by enhancing shade of an input image". The first embodiment allows converting the input image into the output image in which perceived depth and texture of a photographed subject are reproduced favorably.

Experiment 1

Effectiveness of "enhancing spatial frequency components by an enhancement amount that varies in the angular direction of a two-dimensional spatial frequency spectrum of an input image" was evaluated using the image processing device illustrated in FIG. 1.

Figure 3:
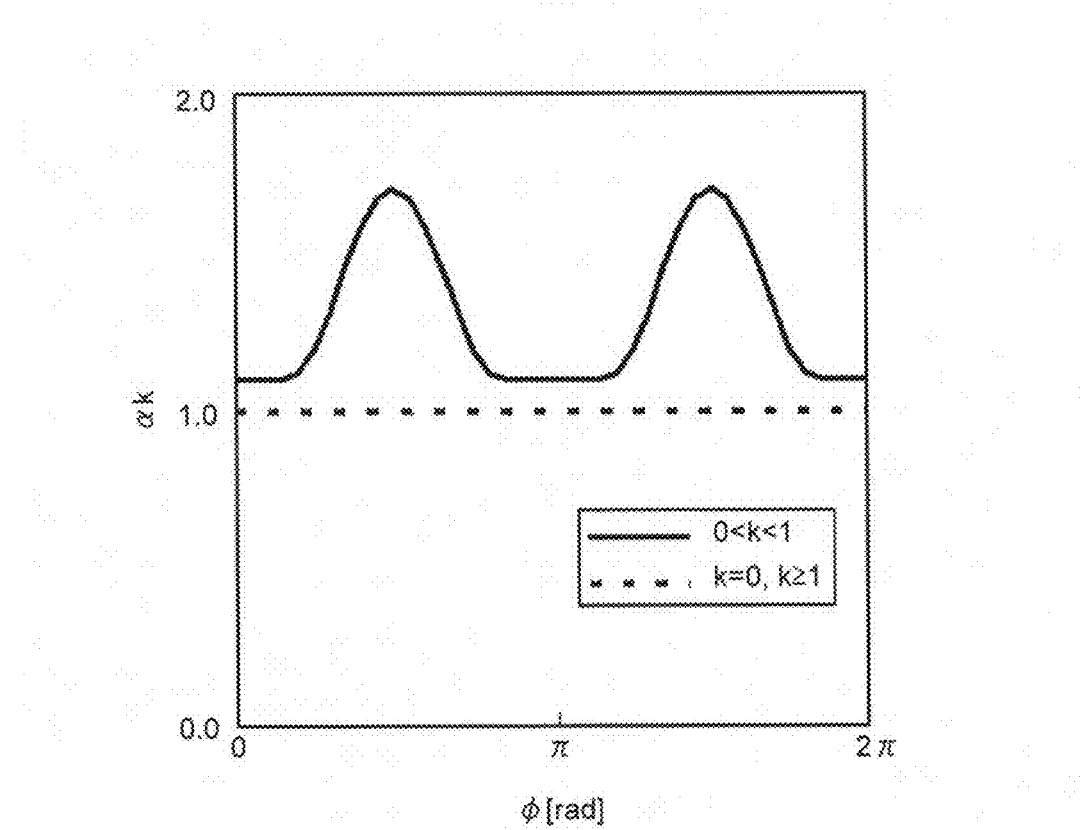
FIG. 3 is a diagram illustrating another example of the anisotropic enhancement coefficient.
Figure 4:
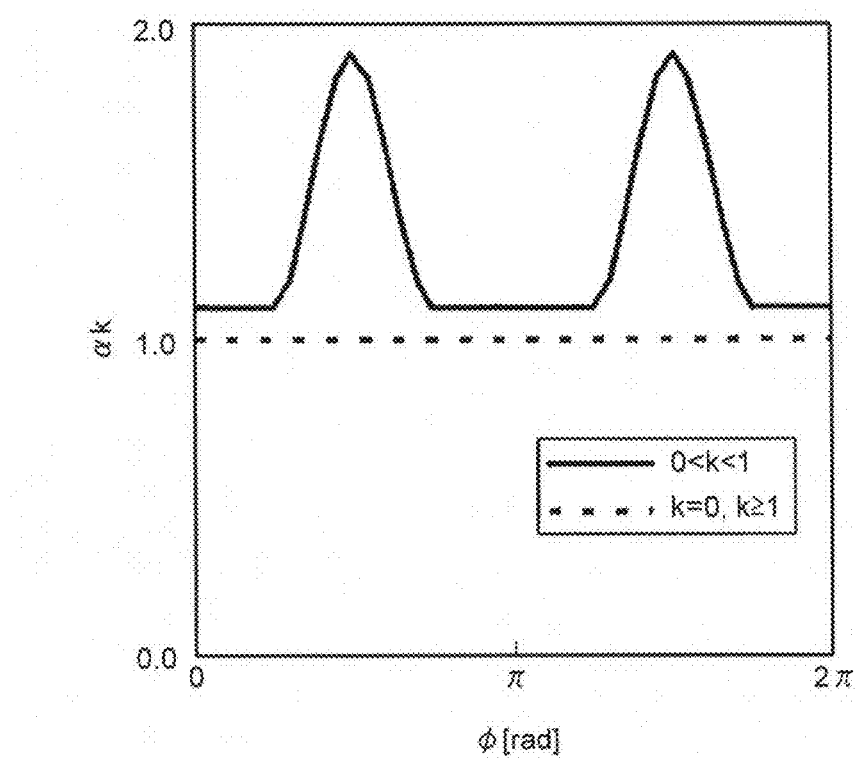
FIG. 4 is a diagram illustrating still another example of the anisotropic enhancement coefficient.

In Experiment 1, not only the enhancement coefficient $\alpha_k$ illustrated in FIG. 2, but also $\alpha_k$ illustrated in FIG. 3 and $\alpha_k$ illustrated in FIG. 4 were used as the enhancement coefficient $\alpha_k$ described above (Equation (12)).

Each of the enhancement coefficient $\alpha_k$ illustrated in FIGS. 3 and 4 allows "enhancing spatial frequency components anisotropically" as does enhancement coefficient $\alpha_k$ of FIG. 2.

Figure 5:
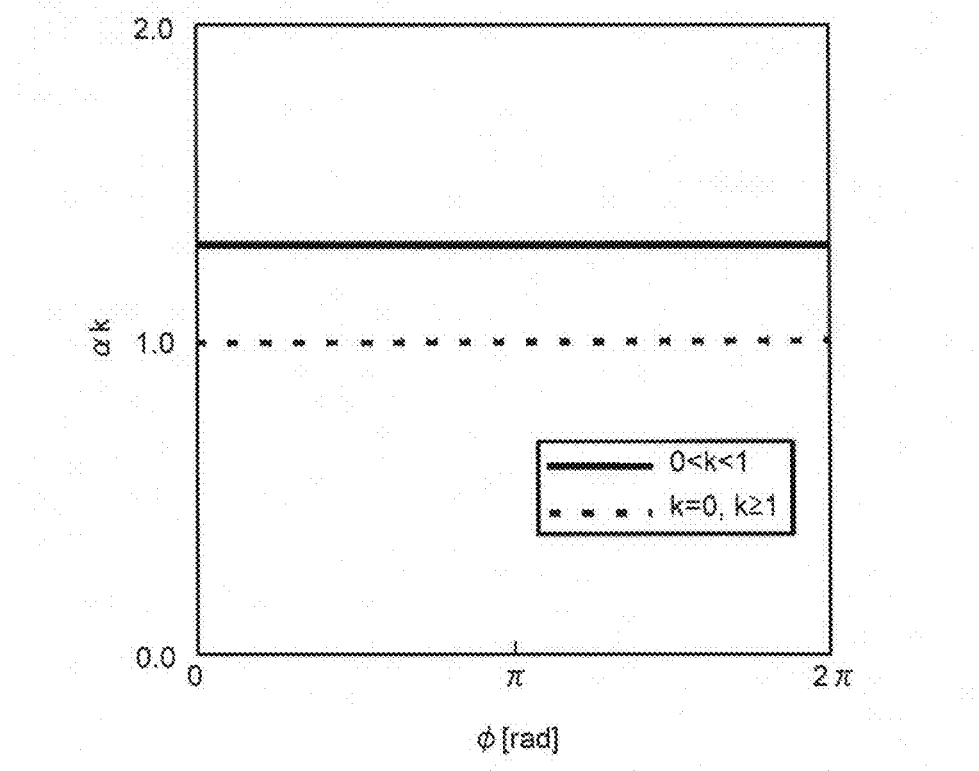
FIG. 5 is a diagram illustrating an example of an isotropic enhancement coefficient.

As a comparative example, experiment was also carried on a condition of "an enhancement coefficient that enhances spatial frequency components isotropically in the angular direction of the spatial frequency spectrum" illustrated FIG. 5.

Experiment 1 aims at evaluating whether there is a difference in effectiveness between the enhancement coefficient $\alpha_k$ applied "anisotropically" and the enhancement coefficient $\alpha_k$ applied "isotropically".

To effect this purpose, the enhancement coefficient of FIGS. 2 to 5 were created so as to have the same "average value of the enhancement coefficient $\alpha_k$", 1.3.

In each of FIGS. 3 and 4, a "region where enhancement amount is increased" is narrower than that of FIG. 2 so that the enhancement amount can be set to large values.

More specifically, an average value, a maximum value, and a minimum value of the enhancement coefficient $\alpha_k$ of FIG. 2 are 1.3, 1.5, and 1.1, respectively.

An average value, a maximum value, and a minimum value of the enhancement coefficient $\alpha_k$ of FIG. 3 are set to 1.3, 1.7, and 1.1, respectively. An average value, a maximum value, and a minimum value of the enhancement coefficient $\alpha_k$ of FIG. 4 are set to 1.3, 1.9, and 1.1, respectively.

The enhancement coefficient $\alpha_k$ of FIG. 5 is a fixed value, 1.3.

Images of 20 types of subjects were used as input images.

These images include images obtained by photographing "subjects having textures and surface roughness" such as an oil painting, a tile, and a curtain, and images (which may be referred to natural images) obtained by photographing a landscape and/or people.

As a "method for evaluating texture and surface roughness (perceived depth)" of output images, visual evaluation was made by displaying an output image and a corresponding input image on a display simultaneously and visually comparing the images.

As the display, "ColorEdge CG221" (trade name; Manufactured by EIZO NANAO Corporation) was used.

The evaluation was made on two criteria, which were "whether texture and surface roughness (perceived depth) are increased" and "whether unnatural appearance is given".

An output image is determined in the visual evaluation as being "unnatural appearance is given" when "it is perceived that some image processing operation is applied" and this perceived operation is found to be "unfavorable".

When making the visual evaluation, image display scaling was adjusted.

More specifically, an image size was determined (in centimeters, millimeters, or the like) depending on the resolution (300 dpi) of the image described above and the number of pixels (pix) of the input image data.

Image display scaling was adjusted so that the determined image size was achieved on the display. The visual evaluation was then carried out.

The visual evaluation on the two criteria were carried out for each of the 20 types of images, to which spatial frequency enhancement was applied using the 4 types of enhancement coefficient of FIGS. 2 to 5.

It is judged as follows: as for "whether texture and surface roughness (perceived depth) are increased", "the larger the number of images that are increased", the more preferable; as for "whether unnatural appearance is given", "the smaller the number of images to which unnatural appearance is given", the more preferable.

The most preferable is that "the number of images that are increased in texture and surface roughness (perceived depth) is large, and the number of images to which unnatural appearance is given is small". Accordingly, overall evaluation was made based on results of evaluation on the two criteria.

"Result of visual evaluation" is presented in Table 1.

TABLE 1

| No. | Enhancement Coefficient $\alpha_k$ | Result of Visual Evaluation (Overall Evaluation) (Increase in Texture And Surface Roughness) (Whether Unnatural Appearance IS Given) |
|---|---|---|
| 1 | FIG. 2 (first embodiment, Equation (12)) | Good Texture and surface roughness are increased: 15 images (of 20 images) Unnatural appearance is given: 4 images (of 20 images) |
| 2 | FIG. 3 | Good Texture and surface roughness are increased: 15 images (of 20 images) Unnatural appearance is given: 3 images (of 20 images) |
| 3 | FIG. 4 | Good Texture and surface roughness are increased: 14 images (of 20 images) Unnatural appearance is given: 2 images (of 20 images) |
| 4 | FIG. 5 (comparative example, isotropic) | Slightly Poor Texture and surface roughness are increased: 10 images (of 20 images) Unnatural appearance is given: 6 images (of 20 images) |

No. 1 to No. 3 are examples of "anisotropic spatial frequency component enhancement" using the enhancement coefficient $\alpha_k$ illustrated in FIGS. 2 to 4.

Each of No. 1 to No. 3 satisfies a condition that "the number of images that are increased in texture and surface roughness is large, and the number of images to which unnatural appearance is given is small" and therefore can be rated high.

No. 4 is an example of "isotropic spatial frequency component enhancement" using the enhancement coefficient $\alpha_k$ illustrated in FIG. 5.

The number of "images that are increased in texture and surface roughness" of No. 4 is small and the number of "images to which unnatural appearance is given" is large as compared to No. 1 to No. 3.

The result shown in Table 1 can be interpreted as follows.

That is, a condition that satisfies both the two criteria, which are "texture and surface roughness (perceived depth) are increased" and "unnatural appearance is not given", is "applying anisotropic enhancement to spatial frequency components".

Therefore, it is apparent that "enhancing spatial frequency components by an enhancement amount that varies (anisotropically) in a angular direction of a spatial frequency spectrum of an input image" is effective.

Accordingly, it can be concluded that such spatial frequency component enhancement allows obtaining an output image that is increased in texture and surface roughness (perceived depth) and gives less unnatural appearance.

An image processing device according to a second embodiment is described below with reference to FIG. 6. To avoid complexity, elements that are unlikely to be confused are denoted by like reference numerals to those of FIG. 1.

In the image processing device of the first embodiment described above, the image processing device 10 has the "function of determining the enhancement parameter φd".

Figure 6:
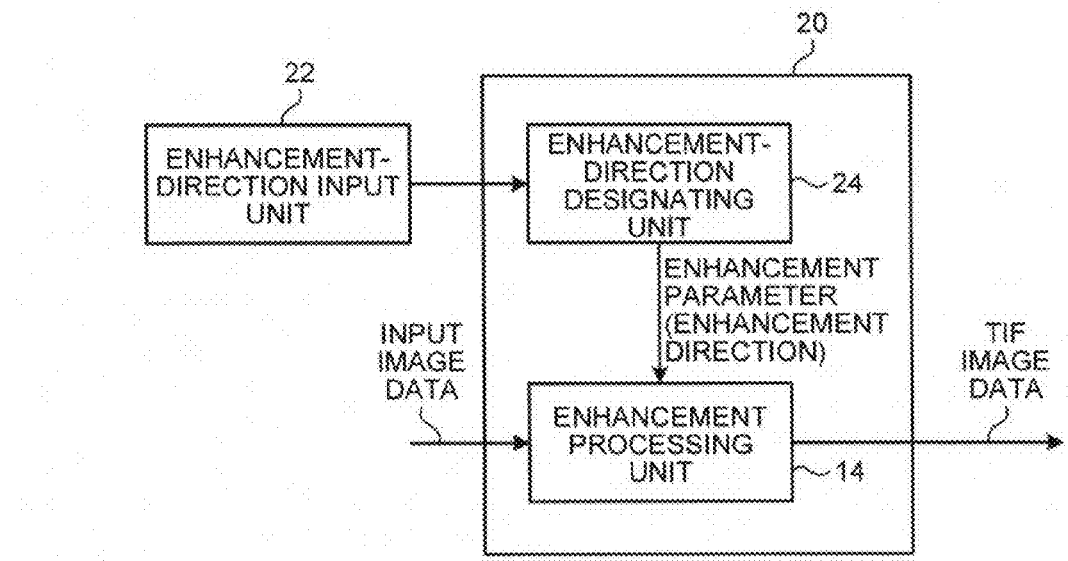
FIG. 6 is a diagram for describing an image processing device according to another embodiment.

An image processing device 20 according to the second embodiment illustrated in FIG. 6 includes an enhancement-direction input unit 22, an enhancement-direction designating unit 24, and the enhancement processing unit 14.

The enhancement processing unit 14 is similar to the enhancement processing unit 14 of the image processing device 10 illustrated in FIG. 1.

In the image processing device 20, a user determines the enhancement parameter φd and enters the enhancement parameter φd from the enhancement-direction input unit 22.

The enhancement-direction input unit 22 is one of elements that make up the image processing device 20.

The enhancement parameter φd entered from the enhancement-direction input unit 22 is transmitted to the enhancement processing unit 14 by the enhancement-direction designating unit 24.

The enhancement processing unit 14 performs enhancement similar to that of the first embodiment based on the enhancement parameter φd.

More specifically, the enhancement processing unit 14 performs enhancement by forming a distribution of enhancement coefficient (such distribution as that illustrated in FIGS. 2 to 4) that maximizes the enhancement amount in the direction of the enhancement parameter φd.

A user may select the enhancement parameter φd to be entered from values prepared in advance in a form of, e.g., a table, or may set the enhancement parameter φd arbitrarily.

Because an appropriate value of the enhancement parameter φd varies depending on the input image, it is desirable to set the enhancement parameter φd for each input image.

As described above, in a large number of images, "direction where spatial frequency components of an image increase in magnitude coincides with direction where shade is given in the image".

However, these directions do not "always" coincide with each other.

There can be a situation where "the direction where large spatial frequency components lie" of an input image does not coincide with a direction where shade is given in the input image. This can occur when, for instance, a subject has "a pattern irrelevant to surface roughness".

Examples of such a situation include a situation where the input image is "an image obtained by photographing an oil painting having surface roughness" and a situation where the input image is an image obtained by photographing a natural image having a flat surface.

In such a situation, the enhancement parameter φd (the direction where shade in the input image is enhanced) is likely to differ.

A favorable result is not always obtained by application of the enhancement described above to such a subject in the "direction where large spatial frequency components lie" that does not coincide with the direction where shade is given in the input image.

In this case, whereas "surface roughness and perceived depth" are increased by the enhancement, undesirable side effect that "enhanced pattern of the subject" becomes more noticeable is produced.

Accordingly, the above problem pertaining to such a situation can be avoided by causing a user to "determine the direction where shade is given in an input image by himself/herself" and designate this shade direction via the enhancement-direction designating unit.

Conversion to an output image that is increased in surface roughness and perceived depth can be achieved.

An output image that is increased in surface roughness and perceived depth can thus be obtained only by requiring a user to "supply an input image and designate an enhancement direction" and eliminating the need of performing complicated operations other than those.

For instance, the following scheme can be employed. That is, the "enhancement parameters φd each corresponding to a type of an input image" are categorized into groups of input image types, and the enhancement parameter φd is set for each group in advance.

An appropriate one of the enhancement parameters φd is selected depending on a type of an input image, and input from the enhancement-direction input unit 22.

Conversion from an input image to an output image that is increased in surface roughness (perceived depth) and perceived depth can thus be achieved.

Experiment 2

Comparison among "enhancement applied to different spatial frequency ranges" was made by using the image processing device 10 of the first embodiment described above and causing the enhancement processing unit 14 to enhance the different spatial frequency ranges.

More specifically, "conversion from an input image to an output image" was performed by applying Equation (12) to different "ranges of the spatial frequency k".

Meanwhile, the range of the spatial frequency "k taken in calculation of the summation" of Equation (5) or (6) was caused to be the same as the range of the spatial frequency k to which Equation (12) was applied.

The same input images as those used in Experiment 1 were used in Experiment 2.

More specifically, the input images were the 20 types of images including the images obtained by photographing subjects (oil painting, tile, and curtain) having textures and surface roughness, and the natural images of which subjects were landscapes and people.

The same criteria and evaluation method as those of Experiment 1 were used.

More specifically, evaluation was made on the criteria "whether texture and surface roughness (perceived depth) are increased" and "whether unnatural appearance is given".

As the evaluation method, "visual evaluation of visually comparing an output image and a corresponding input image displayed on a display simultaneously" was made.

"Result of evaluation" is presented in Table 2.

TABLE 2

| No. | Enhanced Spatial Frequency Range (cycles/mm) | Result of Visual Evaluation (Increase in Texture And Surface Roughness) |
|---|---|---|
| 1 | $0.0 \leq k < 1.0$ | Unacceptable Colors of image are undesirably changed because spatial frequency 0.0 is included |
| 2 | $0.0 < k < 1.0$ | Good Texture and surface roughness (perceived depth) are increased |
| 3 | $1.0 < k < 2.0$ | Unacceptable Texture and surface roughness are not increased; contrast of medium-sized structure is enhanced |
| 4 | $2.0 < k < 3.0$ | Unacceptable Texture and surface roughness are not increased; contrast of fine-sized structure is enhanced |
| 5 | $0.0 < k < 2.0$ | Slightly Poor Texture and surface roughness are increased, but enhanced contrast of medium-sized structure is noticeable (inferior to No. 2) |
| 6 | $0.0 < k < 0.5$ | Good Texture and surface roughness (perceived depth) are increased |
| 7 | $0.5 < k < 1.0$ | Good Texture and surface roughness (perceived depth) are increased |

As for No. 1 of Table 2, the range of the spatial frequency k, to which enhancement is applied, includes "k=0.0 (cycles/mm)".

Because this range includes "k=0.0 (cycles/mm)", the output image is changed in "color tone".

This is because enhancing the spatial frequency component k=0.0 is equivalent to "increasing average values of every pixel in the image".

Such a "change in color tone" is not an appropriate change for increasing texture and surface roughness (perceived depth). For this reason, No. 1 is rated as "unacceptable enhanced image".

No. 2 to No. 4 are conditions that vary from one another in "the range of the spatial frequency k to which enhancement is applied". No. 2 corresponds to No. 1 to No. 3 of Experiment 1 of the first embodiment.

As indicated in No. 3 and No. 4 of Table 2, it is found that surface roughness of relatively fine-sized structure on a surface of a subject increases when the range of the spatial frequency k, to which enhancement is applied, is higher than 1.0 (cycles/rum).

However, such an "increase in surface roughness of relatively fine-sized structure" looks as if contrast is simply enhanced, and does not lead to an increase in texture and surface roughness (perceived depth).

No. 5 corresponds to a condition where "both regions of No. 2 and No. 3 are enhanced simultaneously".

It is found that this condition increases texture and surface roughness (perceived depth)"; however, "enhanced contrast of medium-sized structure" resulting from enhancing a high-frequency region (k≥1) is noticeable.

Accordingly, No. 5 is rated as being inferior to No. 2 in overall evaluation.

No. 6 and No. 7 are conditions where the "the enhanced range" of No. 2 is divided into a region of 0.0<k<0.5 and a region of 0.5<k<1.0.

Each of these conditions allows obtaining an output image that is increased in texture and surface roughness (perceived depth).

Accordingly, enhancing any spatial frequency range that falls within the range of the spatial frequency k "0.0<k<1.0" is effective in "increasing texture and surface roughness (perceived depth)" of an output image.

The side effect that "change in colors of an image and simple enhancement of contrast" are noticeable can be reduced effectively by restricting the spatial frequency range to which the enhancement is applied in this way.

A third embodiment is described below with reference to FIG. 7. To avoid complexity, elements illustrated in FIG. 7 that are unlikely to be confused are denoted by like reference numerals to those of FIG. 1.

Figure 7:
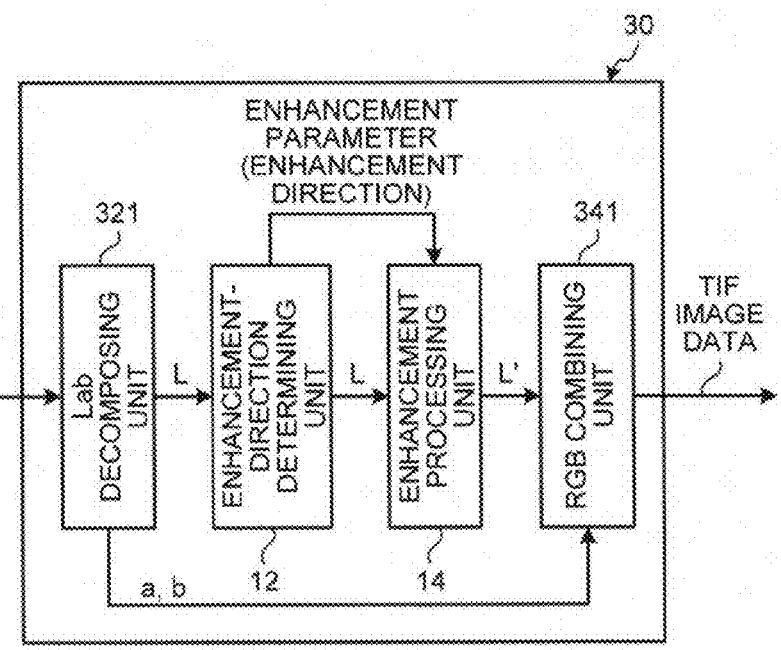
FIG. 7 is a diagram for describing an image processing device according to still another embodiment.

An image processing device 30 illustrated in FIG. 7 includes an Lab decomposing unit 321 arranged upstream of the enhancement-direction determining unit 12 in the image processing device 10 illustrated in FIG. 1, and an RGB combining unit 341 arranged downstream of the enhancement processing unit 14.

In the first embodiment described earlier, "anisotropic spatial frequency component enhancement is applied to respective components of RGB image data".

In contrast, in the third embodiment, transformation from RGB input image data to Lab color space is performed. Anisotropic spatial frequency component enhancement is applied only to L component among L, a, and b components.

Thereafter, conversion from L' component, which is the enhanced L component, and "a and b components that remain unenhanced" to RGB data is performed, thereby obtaining output image data.

The input image data is RGB data. Upon receiving the input image data, the Lab decomposing unit 321 performs transformation of "color space from the RGB space to the Lab space".

Meanwhile, the "Lab color space" is abbreviation for the "CIE L*a*b* (or CIELAB)".

Transformation from the RGB color space to the Lab color space is performed using Formula (14) below.

$$\begin{bmatrix} X \\ Y \\ Z \end{bmatrix} \leftarrow \begin{bmatrix} 0.412453 & 0.357580 & 0.180423 \\ 0.212671 & 0.715160 & 0.072169 \\ 0.019334 & 0.119193 & 0.950227 \end{bmatrix} \cdot \begin{bmatrix} R \\ G \\ B \end{bmatrix} \quad (14)$$

$$L \leftarrow \begin{cases} 116 * Y^{1/3} - 16 & \text{for } Y > 0.008856 \\ 903.3 * Y & \text{for } Y \leq 0.008856 \end{cases}$$

$$X \leftarrow X/X_n, \text{ where } X_n = 0.950456$$

$$Z \leftarrow Z/Z_n, \text{ where } Z_n = 1.088754$$

$$a \leftarrow 500(f(X) - f(Y))$$

$$b \leftarrow 200(f(Y) - f(Z))$$

$$f(t) = \begin{cases} t^{1/3} & \text{for } t > 0.008856 \\ 7.787t + 16/116 & \text{for } t \leq 0.008856 \end{cases}$$

The enhancement-direction determining unit 12 determines the enhancement parameter φd only for the L component among "the three components L, a, and b in the Lab color space" obtained by the transformation using Formula (14).

The enhancement processing unit 14 applies the enhancement to the L component image based on the determined enhancement parameter φd, thereby obtaining L', which is the enhanced L-component image.

The RGB combining unit 341 combines L', which is the enhanced L-component image, and the "a and b components" obtained earlier by the transformation using Formula (14).

This combining corresponds to inverse of decomposition computed by the Lab decomposing unit and is well known.

The third embodiment described with reference to FIG. 7 can be modified in various manners.

The following is a fourth embodiment, an example of such modifications.

The fourth embodiment is described below with reference to FIG. 7 while replacing the description about the third embodiment as required.

In the fourth embodiment, "input image data that is RGB data is decomposed into components in the HSV color space" at a stage upstream of the enhancement-direction determining unit 12.

More specifically, an "HSV decomposing unit" (not shown) that takes the place of the Lab decomposing unit 321 in FIG. 7 performs the decomposition (transformation to the HSV color space).

The transformation from the RGB color space to the HSV color space is performed using Expression (15) below.

$$V \leftarrow \max(R, G, B) \quad (15)$$

$$S \leftarrow \begin{cases} \dfrac{V - \min(R, G, B)}{V} & \text{if } V \neq 0 \\ 0 & \text{otherwise} \end{cases}$$

$$H \leftarrow \begin{cases} 60(G-B)/S & \text{if } V = R \\ 120 + 60(B-R)/S & \text{if } V = G \\ 240 + 60(R-G)/S & \text{if } V = B \end{cases}$$

The "determination of the enhancement direction and application of the enhancement" described above is performed only onto V component of the image data transformed into the HSV color space; the enhancement is not applied to S component and H component.

Thereafter, data V', which is the anisotropically enhanced V component, and the S component and the H component, which remain unenhanced, are combined in the "RGB color space".

This combining corresponds to inverse of the decomposition computed by the HSV decomposing unit and is well known.

The obtained RGB image data is converted into a TIF format, thereby obtaining output image data.

There are "color spaces for representing color images" of various types. The "Lab color space" and the "HSV color space" are specific examples of such a color space.

In the Lab color space, "the a and b components are the components relating to color" and "L is the component relating to luminosity".

In the "HSV color space", every color can be expressed with three components: H (Hue), S (Saturation), and V (Brightness value).

Of the H, S, and V components, "H and S components are components relating to color" and the V component is a component relating to luminosity.

In the third and fourth embodiments, what is enhanced is "only the L component or the V component relating to luminosity" in the Lab color space or the HSV color space, into which image data is transformed from the RGB color space.

Experiment was carried out as follows.

That is, "reference condition" is assumed as a condition of applying the enhancement described above to "all of R, G, and B color components" of image data in the RGB color space.

"L-condition" is assumed as a condition of transforming image data into the Lab color space and applying the enhancement only to L component.

"V-condition" is assumed as a condition of transforming image data into the HSV color space and applying the enhancement only to V component.

Output images obtained respectively with the "reference condition", the "L-condition", and the "V-condition" were compared. As a result, all of the output images exhibited "increase in surface roughness and perceived depth".

As described above, in a large number of images, "direction where spatial frequency components of an image increase in magnitude coincides with direction where shade is given in the image".

Put another way, "surface roughness and perceived depth of a subject" is mainly produced by shading applied onto a surface of the subject or the like.

Shade does not have "information about color" but has only information about brightness (dark-light).

Accordingly, generating an output image by "enhancing shade of an input image" allows obtaining an output image in which texture and surface roughness (perceived depth) of a photographed subject are reproduced favorably.

Thus, "information about brightness" relating to shade of an input image is most important for reproducibility of texture and surface roughness (perceived depth) of a photographed subject.

Accordingly, the effect described above is obtained by applying the "anisotropic enhancement" to L component or V component relating to luminosity among components decomposed in the color space as described above.

As described above, it is found that the output image obtained with any one of the "reference condition", the "L-condition", and the "V-condition" is "increased in surface roughness and perceived depth".

However, each of the L-condition and the V-condition requires smaller amount of computation than the reference condition when consideration is given to amounts of calculations necessary for decomposition into the color space, determination of the enhancement direction, and application of the enhancement.

Accordingly, the L-condition and the V-condition require shorter period of time for computation than the reference condition does, thereby advantageously enabling faster processing.

More specifically, as a result of comparison of "computation time" among the reference condition, the L-condition, and the V-condition, it is found that computation time of each of the L-condition and the V-condition is approximately one-third of that of the reference condition.

In the embodiments described above, computation that requires longest time is computation of "DFT and inverse DFT". With the reference condition, this computation is performed on each of three components, R, G, and B.

In contrast, with the L-condition or the V-condition, this computation is performed on only one component (L component) of Lab or only V component of HSV. Consequently, substantial reduction in computation time is achieved.

Moreover, use of the HSV color space (the V-condition) further brings about the following effect.

As described above, surface roughness and perceived depth of a subject can be created by "enhancing brightness component relating to shade".

The HSV color space can "separate the brightness component V from the color components H and S" relatively favorably and therefore is appropriate for enhancing only variations in brightness originated from shade.

Experiment 3

Experiment 3 below was carried out using the image processing device 10 of the first embodiment.

Experiment 3 is directed to significance of $\alpha_k$max, which is a maximum value of the enhancement coefficient $\alpha_k$ for use by the enhancement processing unit 14.

The maximum enhancement coefficient $\alpha_{kmax}$ is a value "by which a spatial frequency component is to be multiplied" in a direction where enhancement amount is maximized in the anisotropic spatial frequency component enhancement.

The maximum enhancement coefficient $\alpha_k$max is the maximum value of the enhancement coefficient $\alpha_k$ (which is 1.5 in the example illustrated in FIG. 2).

The same input images as those used in Experiment 1 were used in Experiment 3.

More specifically, the input images were the 20 types of images including the images obtained by photographing subjects (oil painting, tile, and curtain) having textures and surface roughness, and the natural images of which subjects were landscapes and people.

Evaluation was made as in Experiment 1 by visual evaluation of visually comparing an output image to which the enhancement was not applied and an output image to which the enhancement was applied displayed on a display.

The evaluation was made on the two criteria, which were "whether texture and surface roughness (perceived depth) are increased" and "whether unnatural appearance is given".

Output images were generated by performing the enhancement using the enhancement coefficient $\alpha_{kmax}$ that was set to the respective values (1.2, 1.4, . . . , 4.0) on each of the 20 types of input images, and visually evaluated.

The enhancement coefficient $\alpha_{kmax}$ was set to "the respective values between 1.2 and 4.0" by adjusting coefficients "0.3 and 0.2" of the following equation of Equation (12).

$$\alpha_k = 1.0 + (0.3 + 0.2 \times \cos(2(\phi - \phi d)))$$

Meanwhile, the minimum value was fixed to 1.1 that was common among all the conditions.

Result of Experiment 3 is presented in Table 3.

TABLE 3

| $\alpha_{kmax}$ | Criterion 1 (Increase in Texture And Surface Roughness) | Criterion 2 (Unnatural Appearance) |
|---|---|---|
| 1.2 | Good | Acceptable |
| 1.4 | Good | Acceptable |
| 1.6 | Good | Acceptable |
| 1.8 | Good | Acceptable |
| 2.0 | Good | Acceptable |
| 2.2 | Good | Acceptable |
| 2.4 | Good | Acceptable |
| 2.6 | Good | Acceptable |
| 2.8 | Good | Acceptable |
| 3.0 | Good | Acceptable |
| 3.2 | Good | Unacceptable |
| 3.4 | Good | Unacceptable |
| 3.6 | Good | Unacceptable |
| 3.8 | Good | Unacceptable |
| 4.0 | Good | Unacceptable |

"Criterion 1" of Table 3 is a criterion as to "whether texture and surface roughness (perceived depth) are increased" as compared with an un-enhanced image obtained by photographing.

"Criterion 2" is a criterion as to "whether unnatural appearance is given".

Referring to the result of evaluation by criterion 1, all the output images, for which the enhancement coefficient $\alpha_{kmax}$ is set to 1.2 or higher, are "increased in texture and surface roughness (perceived depth)".

When the enhancement coefficient $\alpha_{kmax}$ is set to 1.2 or higher, "texture and surface roughness (perceived depth)" increase with the enhancement coefficient $\alpha_{kmax}$.

Referring to the result of evaluation by criterion 2, when the enhancement coefficient $\alpha_{kmax}$ is set to 3.0 or lower, "unnatural appearance is not given to the output image".

On the other hand, when the enhancement coefficient $\alpha_{kmax}$ is 3.2 or higher, it is visually perceived that "enhancement has been applied" and natural surface roughness is not produced.

From Experiment 3, it is found that the enhancement coefficient $\alpha_{kmax}$ is preferably within the following range: $1.2 \leq \alpha_{kmax} \leq 3.0$.

Fifth Embodiment

A fifth embodiment is described below.

The fifth embodiment can be implemented by causing the enhancement processing unit 14 of the image processing device of the first embodiment to have the following function.

That is such a function that causes the enhancement coefficient $\alpha_k$ to have dependence on "the spatial frequency k in the spatial frequency range to which enhancement is applied".

That is such dependence that "values to be applied to a frequency region near an upper limit and a frequency region near a lower limit" are lower than values to be applied to an intermediate frequency region.

In the first embodiment described above, $\alpha_k$ is "a function that is independent from the spatial frequency k in the spatial frequency range to which enhancement is applied" as indicated by Equation (12).

In contrast, in the fifth embodiment, multiplication by "a function that depends on a spatial frequency" is performed in the spatial frequency range to which enhancement is applied.

Also in the fifth embodiment, the enhancement-direction determining unit determines the enhancement parameter φd as in the first embodiment.

However, in the fifth embodiment, the enhancement coefficient $\alpha_k$ defined by Equation (16) below is used in place of Equation (12).

$$\alpha_k = 1.0 + \sin\left(\pi\frac{k - k_{min}}{k_{max} - k_{min}}\right) \times \binom{0.3 + 0.2 \times \cos}{(2(\phi - \phi d))} \quad \text{for } 0.0 < k < 1.0 \quad (16)$$
$$= 1.0 \quad \text{for } k = 0 \text{ or } k \geq 1.0$$

In Equation (16), $k_{max}$ and $k_{min}$ denote an upper limit and a lower limit, respectively, of the spatial frequencies to be enhanced.

In the fifth embodiment, $k_{max}$ and $k_{min}$ are set as follows: $k_{min}$=0.0 (cycles/mm) and $k_{max}$=1.0 (cycle/mm).

Figure 8:
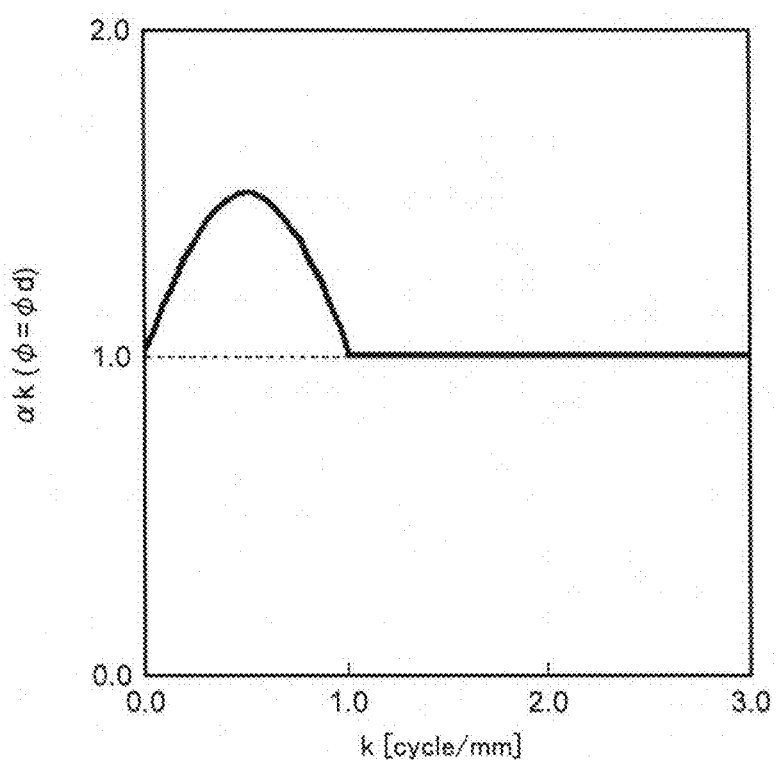
FIG. 8 is a diagram illustrating an example of an enhancement coefficient that varies according to spatial frequency.

FIG. 8 is a diagram of the enhancement coefficient $\alpha_k$, in which the spatial frequency is fixed to "φ=φd". The value of $\alpha_k$ with φ=φd corresponds to the value of $\alpha_{kmax}$.

The enhancement coefficient $\alpha_k$ illustrated in FIG. 8 varies in the spatial frequency region (0.0<k<1.0) where the enhancement is to be applied.

In the spatial frequency region illustrated in FIG. 8, values of $\alpha_k$ in an intermediate frequency region (k=approx. 0.5) are greater than values of $\alpha_k$ in the frequency region near the upper limit (k=approx. 0.0) and the frequency region near the upper limit (k=approx. 1.0).

Enhancement similar to that of the first embodiment is applied using the enhancement coefficient $\alpha_k$ described above.

Inverse DFT is performed on enhanced spatial frequency components.

The file output unit generates TIF data, which is data of a versatile format, based on the enhanced image data, and outputs a file of the data to an external storage device as output image data.

In the fifth embodiment, the enhancement coefficient $\alpha_k$ varies as described above in the spatial frequency range to which the enhancement is applied.

This configuration makes a result of the enhancement "more natural" and effectively reduces "unnatural appearance resulting from an increase in image contrast" produced by the enhancement.

More specifically, this configuration favorably affects image quality attributes other than the increase in texture and surface roughness (perceived depth), thereby reducing the side effect that the resultant image is perceived as "an image that is simply enhanced".

As a result, texture and surface roughness (perceived depth) of a subject can be increased in a more natural fashion.

Figure 9:
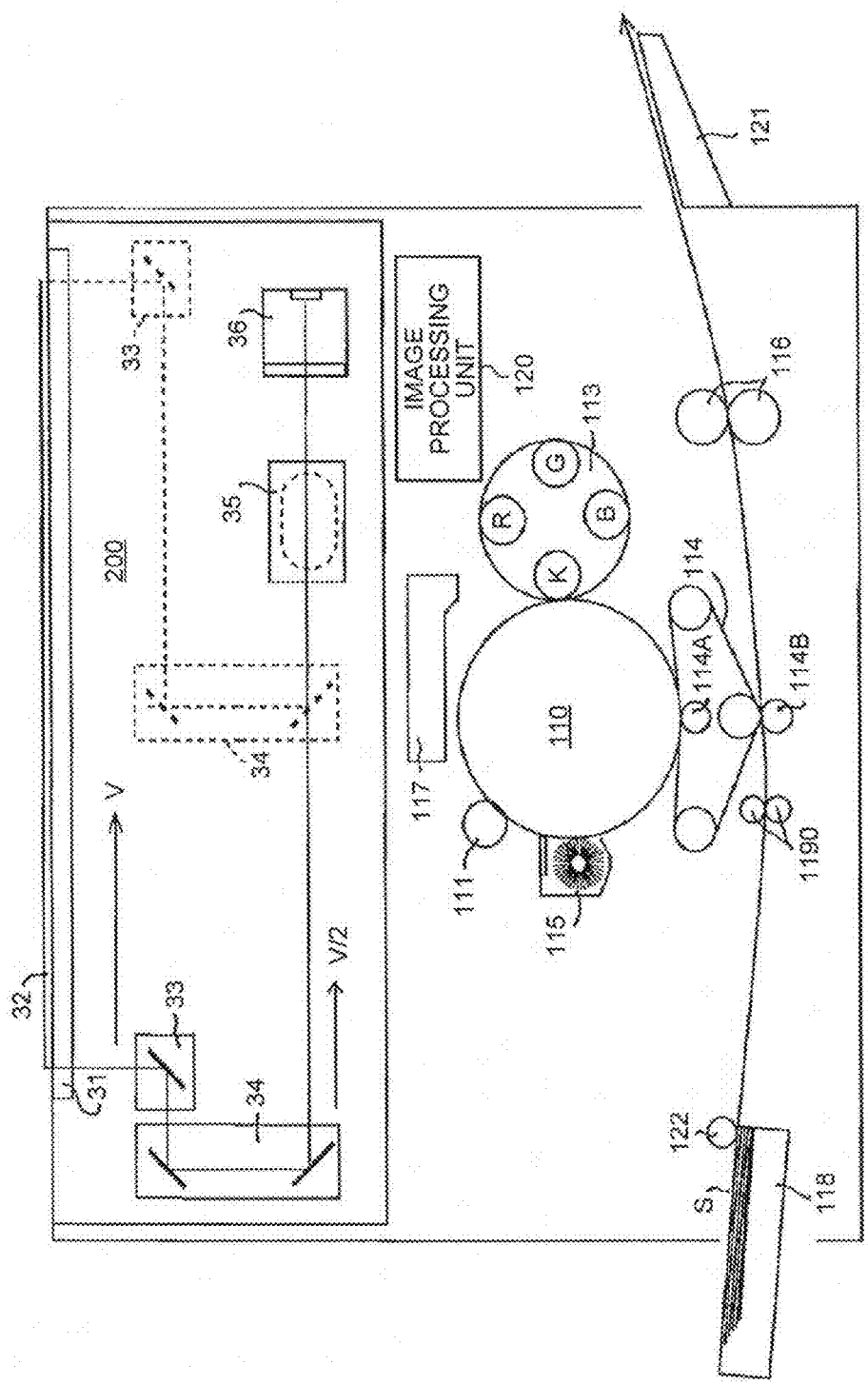
FIG. 9 is a diagram for describing an example implementation of an image forming apparatus.

FIG. 9 illustrates an example implementation of an "image forming apparatus".

The image forming apparatus includes an image reading device 200 arranged at a top of the apparatus and an "image forming unit" arranged below the image reading device 200.

An original document 32 having an image to be read by the image reading device 200 is laid flat on an exposure glass 31 which is a "platen".

An illuminating unit (not shown) arranged below the exposure glass 31 illuminates "a slit-like portion that is elongated in a direction perpendicular to the paper surface of FIG. 9".

Light reflected from an illuminated portion of the original 32 is then reflected from a first mirror arranged on a first carriage 33, and thereafter incident on a second carriage 34.

The light is sequentially reflected by a second mirror and a third mirror arranged on the second carriage 34 and passes through a scanning lens 35 to form a reduced image of the original document's image on an imaging surface of a linear sensor 36.

Each of the first carriage 33 and the second carriage 34 is moved by a driving unit (not shown) to travel in a direction indicated by arrows (rightward in FIG. 9).

The first carriage 33 is moved at a traveling speed "V". The second carriage 34 is moved at a traveling speed "V/2".

Each of the first carriage 33 and the second carriage 34 travels in this manner to corresponding one of "positions indicated by broken lines".

The "illuminating unit (not shown)" moves in one piece with the first carriage 33 to thereby "optically scan" the entire original 32 on the exposure glass 31.

A traveling speed ratio between the first and second carriages is "V:V/2". Accordingly, "length of an optical path from the optically-scanned portion of the original to the scanning lens 35" is maintained invariant.

The linear sensor 36 is a tri-linear CCD made up of photoelectric transducers, each having red (R), green (G), and blue (B) filters as a color separation unit, arranged in three lines on a single chip.

The linear sensor 36 converts the image of the original into image signals while the original 32 is optically scanned.

Scanning of the original 32 is performed in this manner, and the color image of the original 32 is read as being separated into the RGB three primary colors.

The image signals output from the tri-linear sensor 36 of the image reading device 200 are transmitted to the image processing unit 120.

The image processing unit 120 receives the signals input from the linear sensor 36 as "input image data" and converts the data to "output image data" necessary for image formation.

The image processing unit 120 includes, as a function part thereof, the "image processing device" of any one of the embodiments described above.

The image forming unit includes a cylindrical, photoconductive photosensitive element 110 as a "latent image carrier".

An electrostatic charging roller 111, a developing device 113, a transfer belt 114, and a cleaning device 115 are arranged around the photosensitive element 110.

On receiving writing signals (the output image data) from the image processing unit 120, an optical scanning device 117 performs writing by optical scanning to the photosensitive element 110.

This optical writing is performed between the electrostatic charging roller 111 and the developing device 113.

For image formation, the photosensitive element 110 is rotated clockwise at a constant velocity. The electrostatic charging roller 111 uniformly electrostatically charges a surface of the photosensitive element 110, onto which the optical scanning device 117 performs optical writing.

An electrostatic latent image formed by this optical scanning is what is referred to as a "negative latent image", in which image portion is exposed to light.

As the photosensitive element 110 rotates, "image writing" of an R image, a G image, a B image, and a black image is performed in this order.

Developing units R, G, B, and K of the revolving-type developing device 113 sequentially reverse-develop the formed electrostatic latent images into visible, positive images.

A transfer-voltage applying roller 114A sequentially transfers the obtained toner images of the respective colors onto the transfer belt 114.

These toner images of the respective colors are overlaid on one another on the transfer belt 114 to form a color image.

A cassette 118 that houses transfer sheets S therein is detachably attached to an image forming apparatus body. An uppermost sheet of the housed transfer sheets S is fed by a paper feed roller 122.

The fed transfer sheet S is caught at its leading end by a pair of timing rollers 1190.

The pair of timing rollers 1190 delivers the transfer sheet S to a transfer unit in a manner timed to arrival of the "color toner image" on the transfer belt 114 at a transfer position.

The delivered transfer sheet S is overlaid on the color image in the transfer unit. A transfer roller 114B electrostatically transfers the color image onto the transfer sheet S.

During this transfer, the transfer roller 114B presses the transfer sheet S against the color image.

The transfer sheet S, onto which the color image is transferred, is delivered to a fixing device 116 where the color image is fixed onto the transfer sheet S. The transfer sheet S is delivered through a conveying path to be discharged onto a tray 121.

Each time a color toner image is transferred, the cleaning device 115 cleans the surface of the photosensitive element 110 to remove residual toner, paper powder, and the like therefrom.

In the image forming process described above, RGB image signals output from the linear sensor 36 are input to the image processing unit 120 as input image data.

Accordingly, the "input image" is an image obtained by photographing the original 32.

The image processing unit 120 applies the anisotropic spatial frequency enhancement described above to the input image data, thereby obtaining output image signals.

The output image signals are input to the optical scanning device 117 to be used in writing onto the photosensitive element 110.

Image signals from an external device (a computer or the like) can also be input to the image processing unit 120 as "input image data". The image processing unit 120 can apply the enhancement described above also to this data.

Thus, the image processing unit 120 outputs output image data having undergone the anisotropic frequency enhancement of a spatial frequency spectrum in a spatial frequency domain.

Accordingly, forming an image that is increased in surface roughness and perceived depth and does not give unnatural appearance can be achieved.

As described above, according to an aspect of an embodiment, image processing applied to input image data includes "spatial frequency enhancement".

The spatial frequency enhancement is performed by "enhancing spatial frequency components of an input image data by an enhancement amount that varies in a angular direction of a two-dimensional spatial frequency spectrum of the input image data.

This makes it possible to apply image processing to a subject of a wide variety of types, such as "image data obtained by photographing surface roughness of a subject" and "image data of what is referred to as a natural image obtained by photographing a landscape or the like".

Accordingly, an output image that is increased in texture, such as surface roughness and perceived depth, intrinsic to the subject of a wide variety of types can be obtained.

The present invention brings about an effect of allowing an image processing device to generate, from input image data of a subject of a wide variety of types, output image data that is increased in visually-perceived surface roughness and texture intrinsic to the subject.

Although the invention has been described with respect to specific embodiments for a complete and clear disclosure, the appended claims are not to be thus limited but are to be constructed as embodying all modifications and alternative constructions that may occur to one skilled in the art that fairly fall within the basic teaching herein set forth.

What is claimed is:

1. An image processing device comprising:
   circuitry configured to
   calculate spatial frequency of input image data and determine a frequency component in which a distribution amount of the spatial frequency maximizes, and
   perform an enhancement process by applying, to the input image data, an enhancement amount that varies according to the distribution amount of the spatial frequency, based on the determined frequency component, the spatial frequency including two-dimensional spatial frequency components ($\kappa$, $\theta$) expressed in polar coordinates, and the enhancement process being performed under a condition where spatial frequency component $\kappa$ of the spatial frequency components ($\kappa$, $\theta$) is within a range of $0.0 < \kappa < 1.0$ (cycles/mm).

2. The image processing device set forth in claim 1, wherein
   the enhancement process is performed such that the enhancement amount maximizes along a direction of the spatial frequency component in which the distribution amount of the spatial frequency maximizes.

3. The image processing device set forth in claim 2, wherein the circuitry is further configured to designate a direction in which the distribution amount of the spatial frequency maximizes.

4. The image processing device set forth in claim 2, wherein the enhancement amount is expressed as $\alpha_k$, a value of $\alpha_k$ when the spatial frequency component κ is within the range is greater than the value of $\alpha_k$ when the spatial frequency component κ is out of the range, and the enhancement process comprises multiplying the input image data by $\alpha_k$.

5. The image processing device set forth in claim 4, wherein the value of $\alpha_k$ includes maximum value of $\alpha_{kmax}$, and the value of $\alpha_{kmax}$ satisfies a condition of $1.2 \leq \alpha_{kmax} \leq 3.0$.

6. The image processing device set forth in claim 1, wherein the circuitry is further configured to receive color input image data having at least three color components and transform the color input image data into a second color space different from a first color space of the color input image data, and inversely transform the transformed color input image data into the first color space after the enhancement process is performed, wherein the enhancement process is performed for no more than two color components of the transformed color input image data.

7. The image processing device set forth in claim 6, wherein the second color space consists of Lab color space, the enhancement process is performed for the L component of the transformed color input image data, and the circuitry inversely transforms image data for which the enhancement process is performed of the Lab color space into the first color space.

8. The image processing device set forth in claim 6, wherein the second color space consists of HSV color space, the enhancement process is performed for the V component of the transformed color input image data, and the circuitry inversely transforms image data for which the enhancement process is performed of the HSV color space into the first color space.

9. An image forming apparatus comprising the image processing device set forth in claim 1, the image forming apparatus forming an image from the input image data processed by the image processing device.

10. An image processing method implemented by a computer, the method comprising:

calculating spatial frequency of input image data;

determining a frequency component in which a distribution amount of the spatial frequency maximizes; and performing an enhancement process by applying, to the input image data, an enhancement amount that varies according to the distribution amount of the spatial frequency, based on the determined frequency component, the spatial frequency including two-dimensional spatial frequency components (κ, θ) expressed in polar coordinates, and the enhancement process being performed under a condition where spatial frequency component κ of the spatial frequency components (κ, θ) is within a range of $0.0 < κ < 1.0$ (cycles/mm).

11. A computer program product comprising a non-transitory computer readable storage medium in which computer program instructions are stored, the instructions, when executed by a computer, cause the computer to perform an image processing method, the method comprising:

calculating spatial frequency of input image data;

determining a frequency component in which a distribution amount of the spatial frequency maximizes; and performing an enhancement process by applying, to the input image data, an enhancement amount that varies according to the distribution amount of the spatial frequency, based on the determined frequency component, the spatial frequency including two-dimensional spatial frequency components (κ, θ) expressed in polar coordinates, and the enhancement process being performed under a condition where spatial frequency component κ of the spatial frequency components (κ, θ) is within a range of $0.0 < κ < 1.0$ (cycles/mm).

* * * * *